(12) United States Patent
Ogata (10) Patent No.: US 7,473,203 B2
(45) Date of Patent: Jan. 6, 2009

(54) TRANSMISSION APPARATUS

(75) Inventor: Tomoaki Ogata, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 11/532,229

(22) Filed: Sep. 15, 2006

(65) Prior Publication Data

US 2007/0243968 A1    Oct. 18, 2007

(30) Foreign Application Priority Data

Apr. 12, 2006    (JP) ............................. 2006-109551

(51) Int. Cl.
*F16H 3/62* (2006.01)

(52) U.S. Cl. ...................... 475/209; 475/330
(58) Field of Classification Search ................ 475/207, 475/208, 209, 288, 289, 330, 329, 903
See application file for complete search history.

(56) References Cited

U.S. PATENT DOCUMENTS

| | | | | |
|---|---|---|---|---|
| 4,726,258 | A * | 2/1988 | Hayashi et al. | 475/209 |
| 6,154,700 | A * | 11/2000 | Jones | 701/51 |
| 6,471,615 | B1 * | 10/2002 | Naraki et al. | 475/262 |
| 6,752,739 | B2 * | 6/2004 | Bucknor et al. | 475/296 |
| 6,846,262 | B2 * | 1/2005 | Williams et al. | 475/204 |
| 6,969,335 | B2 * | 11/2005 | Lorken | 475/302 |
| 6,976,931 | B2 * | 12/2005 | Raghavan et al. | 475/296 |
| 7,186,203 | B2 * | 3/2007 | Tabata et al. | 475/286 |
| 7,294,079 | B2 * | 11/2007 | Raghavan et al. | 475/5 |

FOREIGN PATENT DOCUMENTS

| JP | 58-005561 A | 1/1983 |
|---|---|---|
| JP | 63-067670 A | 3/1988 |
| JP | 06-323415 A | 11/1994 |
| JP | 11-105585 A | 4/1999 |
| JP | 2004-270891 A | 9/2004 |

* cited by examiner

*Primary Examiner*—Thu Nguyen
*Assistant Examiner*—Erin D Bishop
(74) *Attorney, Agent, or Firm*—Sughrue Mion, PLLC (57) ABSTRACT

A transmission apparatus can perform a shift operation quickly without generating tooth contact and gear noise when shifting to a nonsynchronized gear train. The apparatus includes a first clutch; a first and a second input shaft; an output shaft; a planetary gear mechanism having a first and a second planetary gear train, a band brake and a direct clutch; a selection type gear train unit having a nonsynchronized gear train; a second rotation speed detector for detecting the rotation speed of the second input shaft as a second rotation speed; actuators; and a gear shift control part for controlling the actuators. When a request for shift to the nonsynchronized gear train is generated, the first clutch is released, the band brake is tightened, and the direct clutch is connected to reduce the second rotation speed. When the second rotation speed becomes equal to or less than a predetermined speed, a gear shift is executed.

2 Claims, 9 Drawing Sheets

| GEAR SHIFT STAGE<br>TRANSMISSION GEAR RATIO | FIRST GEAR | SECOND GEAR | THIRD GEAR | FOURTH GEAR | FIFTH GEAR | REVERSE |
|---|---|---|---|---|---|---|
| PLANETARY GEAR MECHANISM (FIRST INPUT SHAFT/SECOND INPUT SHAFT) | 2.659 | 1.53 | 1 | 1 | 1 | 1.53 |
| SELECTION TYPE GEAR TRAIN UNIT (SECOND INPUT SHAFT/OUTPUT SHAFT) | 1.257143 | 1.257143 | 1.257143 | 0.926829 | 0.673913 | 2.041667 |
| ENTIRE AUTOMATIC TRANSMISSION (FIRST INPUT SHAFT/OUTPUT SHAFT) | 3.342743 | 1.923429 | 1.257143 | 0.926829 | 0.673913 | 3.12375 |

TRANSMISSION APPARATUS

BACKGROUND OF THE INVENTION

1. Field of the Invention

The present invention relates to a transmission apparatus installed on a vehicle such as for example a motor vehicle.

2. Description of the Related Art

In general, a motor vehicle is provided with a transmission for converting the power of an engine into a torque and a rotation speed corresponding to the operating state of the engine. As such a transmission, there have been proposed a manual transmission that changes the transmission gear ratio by shifting gear trains by a manual operation, an automatic transmission that changes the transmission gear ratio by automatically shifting gear trains in accordance with the operating condition of an engine by using a driving unit, and so on.

In addition, in recent years, regulations or restrictions on fuel mileage or economy is becoming severe, and hence improvements in fuel mileage is increasingly required.

Accordingly, there has been proposed an automatic transmission that is able to perform automatic transmission by attaching actuators to a manual transmission and a clutch, respectively. Such an automatic transmission is provided with gear trains including plural stages and a change-over or shift mechanism that shifts the gear trains, so that an actuator makes the change-over mechanism perform a shift operation and a selection operation thereby to shift the gear trains and to change the transmission gear ratio.

Moreover, for a forward drive first-speed gear train or a driving reverse (back) gear train among the gear trains with plural stages in the automatic transmission, there is employed a gear train that does not use any synchronization mechanism (hereinafter referred to as "the nonsynchronized gear train") for synchronizing the rotation speeds of individual gear wheels.

In such an automatic transmission, when a shift is made to the nonsynchronized gear train (the forward drive first-speed gear train or the driving reverse gear train), the vehicle is standing still, and hence the output shaft of the automatic transmission is stopped. In addition, the input shaft of the automatic transmission becomes equal to or slightly lower than the idling rotation speed of the engine (i.e., about 800 rpm) because immediately after the clutch has been turned off.

Here, note that there is a feature that a shift to the nonsynchronized gear train is easy due to the shapes of the gear wheels when the rotation speed of the input shaft is in a range of from 250 to 350 rpm.

Therefore, in case where the gear is shifted to the nonsynchronized gear train, a gear change or shift might not be made due, for example, to the occurrence of tooth contact of the gear wheels in which the crests of the gear wheels are placed in contact with each other when the rotation speed of the input shaft is too low, whereas when the rotation speed of the input shaft is too high, the gear wheels might become unable to come into engagement with each other in a smooth manner, generating gear sounding in which sound or noise is generated.

In view of such a situation, the conventional automatic transmission apparatus for a vehicle uses a gear transmission and a mechanical clutch, and drives them under electronic control so as to perform a gear change operation to a requested shift stage or speed in an automatic manner. Also, the apparatus includes, as shift stages of the gear transmission, a synchronized stage (a gear train using a synchronization mechanism) and a nonsynchronized stage (a nonsynchronized gear train), and has a nonsynchronized shift control part and a retry shift control part.

Under such a condition, when the clutch is turned off or disconnected upon generation of a request for shift to the nonsynchronized gear stage, the nonsynchronized shift control part starts shifting the transmission to the synchronized stage. When a rotation speed difference between a countershaft (input shaft) and a main shaft (output shaft) decreases up to an upper limit value at which gears can be placed into synchronous meshing engagement with each other, a shift to the nonsynchronized stage is carried out after returning the transmission to a neutral position or stage. When the rotation speed difference between the main shaft and the countershaft is reduced below a lower limit value for avoiding the stopping of the countershaft rotation during such control, the retry shift control part returns the transmission to the neutral stage, and at the same time, temporarily connects or turns on the clutch thereby to increase the rotation of the countershaft, and then disconnects or turns off the clutch whereby a shift to the nonsynchronized stage is carried out again (see, for example, a first patent document: Japanese patent application laid-open No. H11-105585).

Hereinafter, reference will be made to the operation of the conventional apparatus as described in the above-mentioned first patent document while referring to an explanatory view of FIG. 10.

Figure 10:
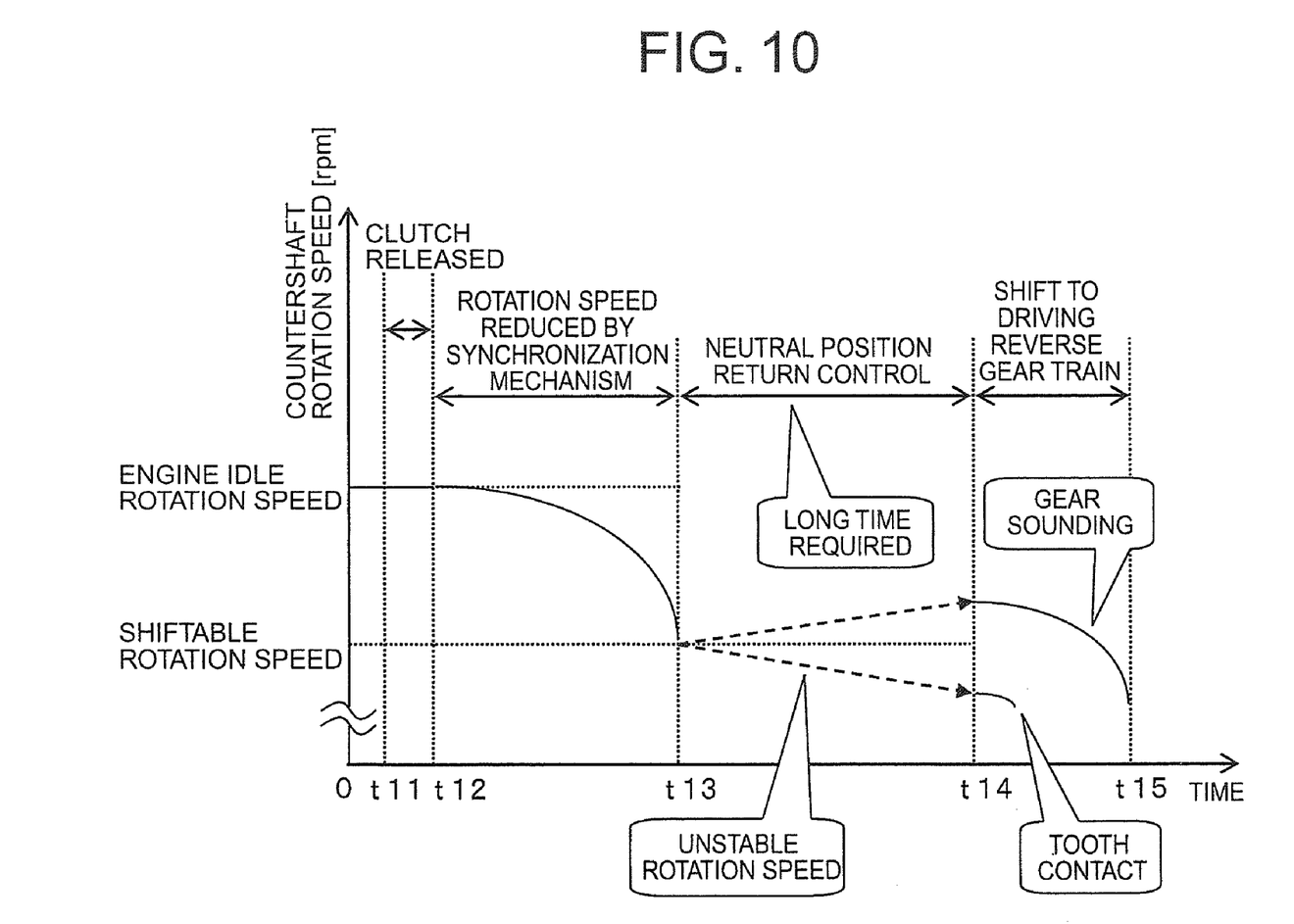
FIG. 10 is a timing chart illustrating the operation of a conventional automatic transmission apparatus for a vehicle.

In FIG. 10, first of all, when a request for shift to the nonsynchronized stage (the driving reverse gear train) is generated, the clutch is released at time t11, and the nonsynchronized shift control part then starts shifting the transmission to the synchronized stage at time t12.

Subsequently, at time t13 at which the rotation speed difference between the countershaft and the main shaft decreases to the upper limit value at which the gears can be put into synchronous meshing engagement with each other, the nonsynchronized shift control part returns the transmission to the neutral stage.

Then, at time t14 at which the transmission has been returned to the neutral stage, the nonsynchronized shift control part performs a shift of the transmission to the driving reverse gear train, and at time t15, the shift operation is completed.

In the conventional automatic transmission apparatus for a vehicle, however, there is the following problem. That is, it is impossible to perform the reduction of the rotation speed of the countershaft due to a shift to the synchronized stage and a shift operation to the nonsynchronized stage in parallel with respect to each other in view of the construction thereof, so a long time is required for a shift operation from the start to the end or completion of the gear shift.

In addition, there is also another problem that it is necessary to return the transmission to the neutral stage when a shift is made from the synchronized stage to the nonsynchronized stage, so the rotation speed of the countershaft might become irregular, thus generating tooth contact or gear sounding

SUMMARY OF THE INVENTION

Accordingly, the present invention is intended to obviate the problems as referred to above, and has for its object to provide a transmission apparatus that can perform a shift operation in a quick manner without generating tooth contact and gear noise when shifting a transmission gear to a nonsynchronized gear train.

Bearing the above object in mind, according to the present invention, there is provided a transmission apparatus which includes a crankshaft that takes out the power of an engine as a rotational force; a first clutch that is connected with the crankshaft for transmitting and interrupting the rotation of the engine; a first input shaft that is connected with the first clutch at a side opposite to the crankshaft; a second input shaft that is arranged on an extension of the first input shaft; and an output shaft that is arranged in parallel to the first input shaft and the second input shaft. The apparatus further includes: a planetary gear mechanism that includes a first planetary gear train, a second planetary gear train, a sun gear being common for the first and second planetary gear trains, a band brake for fixing the sun gear, and a second clutch that connects the sun gear with a first ring gear of the first planetary gear train, the planetary gear mechanism being operable to transmit the rotation of the first input shaft to the second input shaft; and a selection type gear train unit that includes a plurality of gear trains having a nonsynchronized gear train that does not use any synchronization mechanism, the selection type gear train unit being operable to transmit the rotation of the second input shaft to the output shaft. The apparatus further includes: a second rotation speed detection part that detects the rotation speed of the second input shaft as a second rotation speed; a first clutch actuator that drives the first clutch; a band brake actuator that drives the band brake; a second clutch actuator that drives the second clutch; a shift actuator that shifts the gear trains of the selection type gear train unit; and a gear shift control part to which the second rotation speed is input, and which controls the operations of the first clutch actuator, the band brake actuator, the second clutch actuator and the shift actuator. When a request for shift to the nonsynchronized gear train is generated, the gear shift control part releases the first clutch, tightens the band brake, and at the same time connects the second clutch thereby to decrease the second rotation speed, and when the second rotation speed becomes equal to or less than a predetermined rotation speed, the gear shift control part shifts the gear trains of the selection type gear train unit to the nonsynchronized gear train.

According to the transmission apparatus of the present invention, when a request for shift to the nonsynchronized gear train is generated, the gear shift control part releases the first clutch, tightens the band brake, and at the same time, connects the second clutch thereby to reduce the rotation speed of the second input shaft, whereas when the second rotation speed becomes equal to or less than the predetermined rotation speed, the gear is shifted to the nonsynchronized gear train. As a result, the shift operation can be completed in a quick manner without generating tooth contact and gear noise.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, a preferred embodiment of the present invention will be described in detail while referring to the accompanying drawings. Throughout respective figures, the same or corresponding members or parts are identified by the same reference numerals and characters.

Embodiment 1

Figure 1:
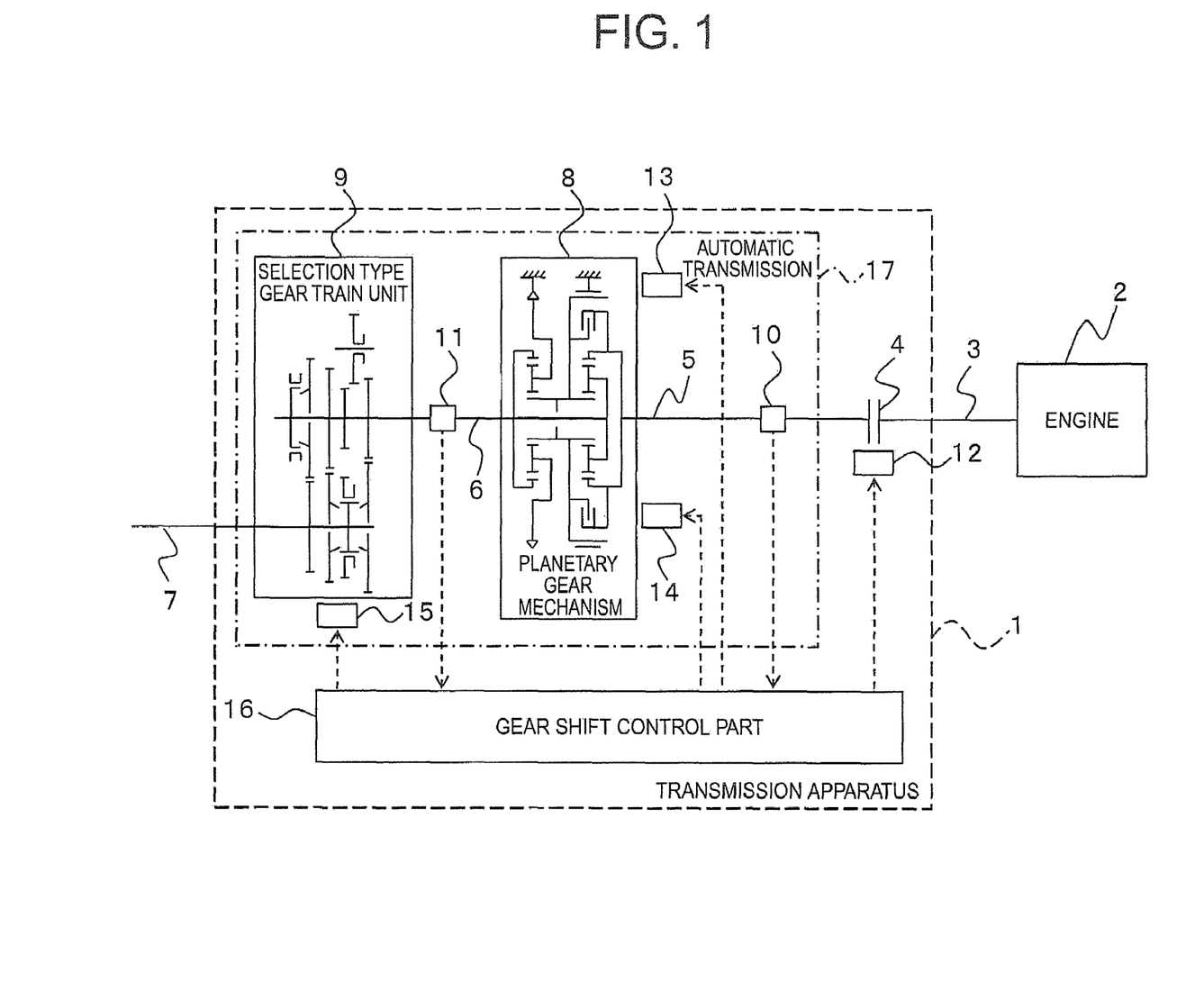
FIG. 1 is a construction view showing a transmission apparatus according to a first embodiment of the present invention, together with an engine.

Referring to the drawings and first to FIG. 1, there is shown a transmission apparatus 1 according to a first embodiment of the present invention, together with an engine 2.

In FIG. 1, the transmission apparatus 1 includes a crankshaft 3, a first clutch 4, a first input shaft 5, a second input shaft 6, an output shaft 7, a planetary gear mechanism 8, a selection type gear train unit 9, a first rotation speed sensor (first rotation speed detection part) 10, a second rotation speed sensor (second rotation speed detection part) 11, a first clutch actuator 12, a band brake actuator 13, a direct clutch actuator (second clutch actuator) 14, a shift actuator 15, and a gear shift control part 16.

Here, note that the first input shaft 5, the second input shaft 6, the output shaft 7, the planetary gear mechanism 8, the selection type gear train unit 9, the first rotation speed sensor 10, the second rotation speed sensor 11, the band brake actuator 13, the direct clutch actuator 14 and the shift actuator 15 together constitute an automatic transmission 17 that serves to convert the power of the engine 2 into a torque and a rotation speed corresponding to the operating state of the engine 2.

The crankshaft 3 takes out the power of the engine 2 as a rotational force. The first clutch 4 is connected with the crankshaft 3, and serves to control (i.e., transmit and interrupt) the rotation of the engine 2.

The first input shaft 5 is connected with the first clutch 4 at a side opposite to the crankshaft 3, and the second input shaft 6 is arranged in alignment with, or on an imaginary extension of, the first input shaft 5. The output shaft 7 is arranged in parallel to the first input shaft 5 and the second input shaft 6.

The first rotation speed sensor 10 detects the rotation speed of the first input shaft 5 as a first rotation speed, and the second rotation speed sensor 11 detects the rotation speed of the second input shaft 6 as a second rotation speed.

The first clutch actuator 12 drives the first clutch 4, and the band brake actuator 13 drives the band brake 32 (to be described later). The direct clutch actuator 14 drives the direct clutch 35 (second clutch) (to be described later). The shift actuator 15 shifts the gear trains (to be described later) of the selection type gear train unit 9 that is arranged at a side more remote from the first clutch 4 than the planetary gear mechanism 8.

The gear shift control part 16 calculates the ratio of the rotation speeds of the first input shaft 5 and the second input shaft 6 based on the first rotation speed detected by the first rotation speed sensor 10 and the second rotation speed detected by the second rotation speed sensor 11. Also, the gear shift control part 16 controls the operations of the first clutch actuator 12, the band brake actuator 13, the direct clutch actuator 14 and the shift actuator 15.

In addition, when a request for shifting the transmission gear to the nonsynchronized gear train is generated, as will be described later, the gear shift control part 16 releases the first clutch 4, tightens the band brake 32, and at the same time, connects the direct clutch 35 thereby to reduce the rotation speed of the second input shaft 6, whereas when the second rotation speed becomes equal to or less than a predetermined rotation speed, the gear shift control part 16 shifts the gear to the nonsynchronized gear train.

Figure 2:
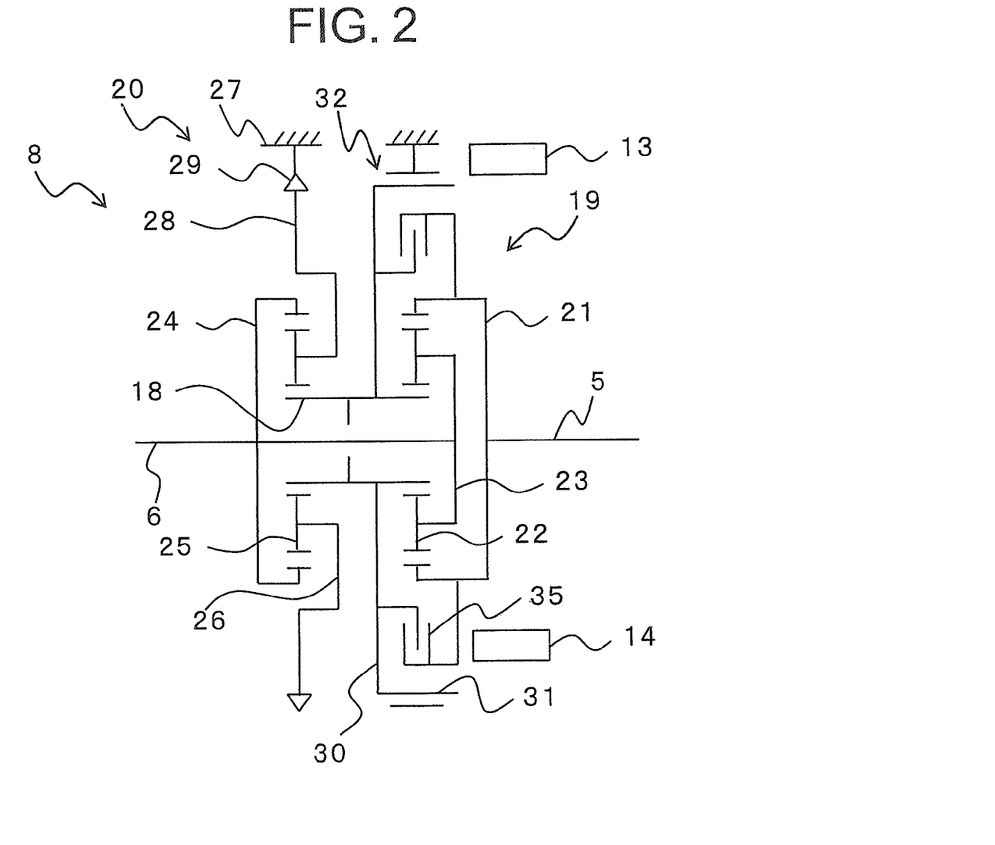
FIG. 2 is a construction view showing the details of a planetary gear mechanism according to the first embodiment of the present invention.

FIG. 2 is a construction view that shows in detail the planetary gear mechanism 8 according to the first embodiment of the present invention.

In FIG. 2, the planetary gear mechanism 8 is arranged between the first input shaft 5 and the second input shaft 6 for transmitting the rotation of the first input shaft 5 to the second input shaft 6. This planetary gear mechanism 8 is of Simpson type comprising two rows of a first planetary gear train 19 and a second planetary gear train 20 with a sun gear 18 being used in common for these gear trains.

The first planetary gear train 19 includes a first ring gear 21, a first pinion gear 22 and the sun gear 18. The first ring gear 21 is fixedly attached to an end of the first input shaft 5 at a side opposite to the first clutch 4, and the first pinion gear 22 is rotatably supported on a first carrier 23 that is fixedly attached to one end of the second input shaft 6. The sun gear 18 is rotatably supported on the second input shaft 6 so as to be rotatable therearound.

The second planetary gear train 20 includes a second ring gear 24, a second pinion gear 25 and the sun gear 18. The second ring gear 24 is fixedly attached to the second input shaft 6, and the second pinion gear 25 is rotatably supported on a second carrier 26 which is rotatable around the second input shaft 6 in such a manner that it is rotatable along the outer periphery of the second ring gear 24.

In addition, the second carrier 26 has an extended portion 28 that extends in a direction toward a case 27 of the automatic transmission 17. A one-way clutch 29 is arranged between the case 27 and the extended portion 28 for inhibiting the reverse rotation thereof.

In addition, the sun gear 18 has an annular member 30 that extends from a substantially axial center toward the case 27, and a cylindrical member 31 that extends from an outer edge of the annular member 30 toward the first input shaft 5 so as to cover the outer periphery of the first ring gear 21.

The cylindrical member 31 has a band brake 32 for fixing and releasing the sun gear 18.

Figure 3:
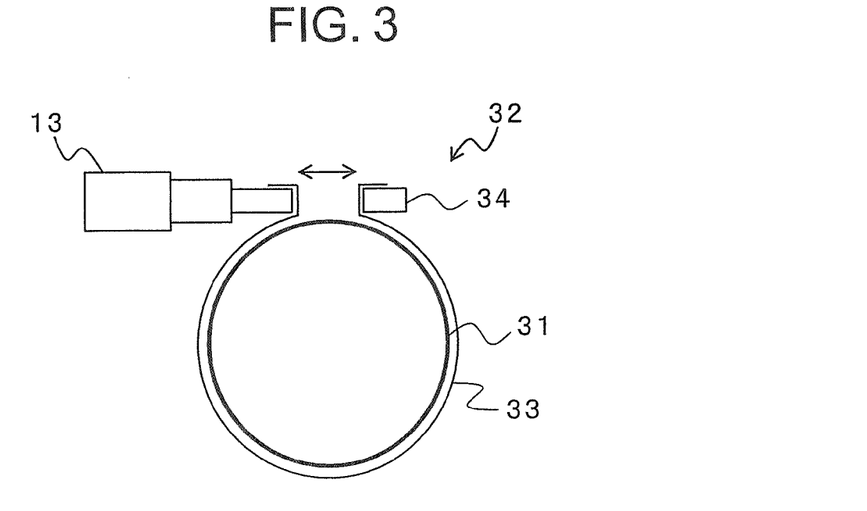
FIG. 3 is a side elevation showing the details of a band brake that is shown in FIG. 2.

FIG. 3 is a side elevation that shows the details of the band brake 32, as shown in FIG. 2.

In FIG. 3, the brake band 33 is wound around the cylindrical member 31 in a circumferential direction thereof, and has its one end fixedly fastened to the case 27 as its fixed end by means of a fastening member 34. Also, the brake band 33 has its other end connected with the band brake actuator 13 as a free end.

The band brake actuator 13 serves to fix and release the sun gear 18 through the cylindrical member 31 by driving the brake band 33 to perform a tightening operation and a loosening or releasing operation.

In addition, in FIG. 2, the direct clutch 35 is provided on the outer periphery of the first ring gear 21 for connecting the sun gear 18 and the first ring gear 21. The direct clutch 35 is a friction type clutch (whether of a single plate type or a multi-plate type, and whether of a dry type or a wet type), and is connected with the direct clutch actuator 14.

The direct clutch actuator 14 serves to connect and release the sun gear 18 and the first ring gear 21 with respect to each other by connecting and releasing the direct clutch 35.

Figure 4:
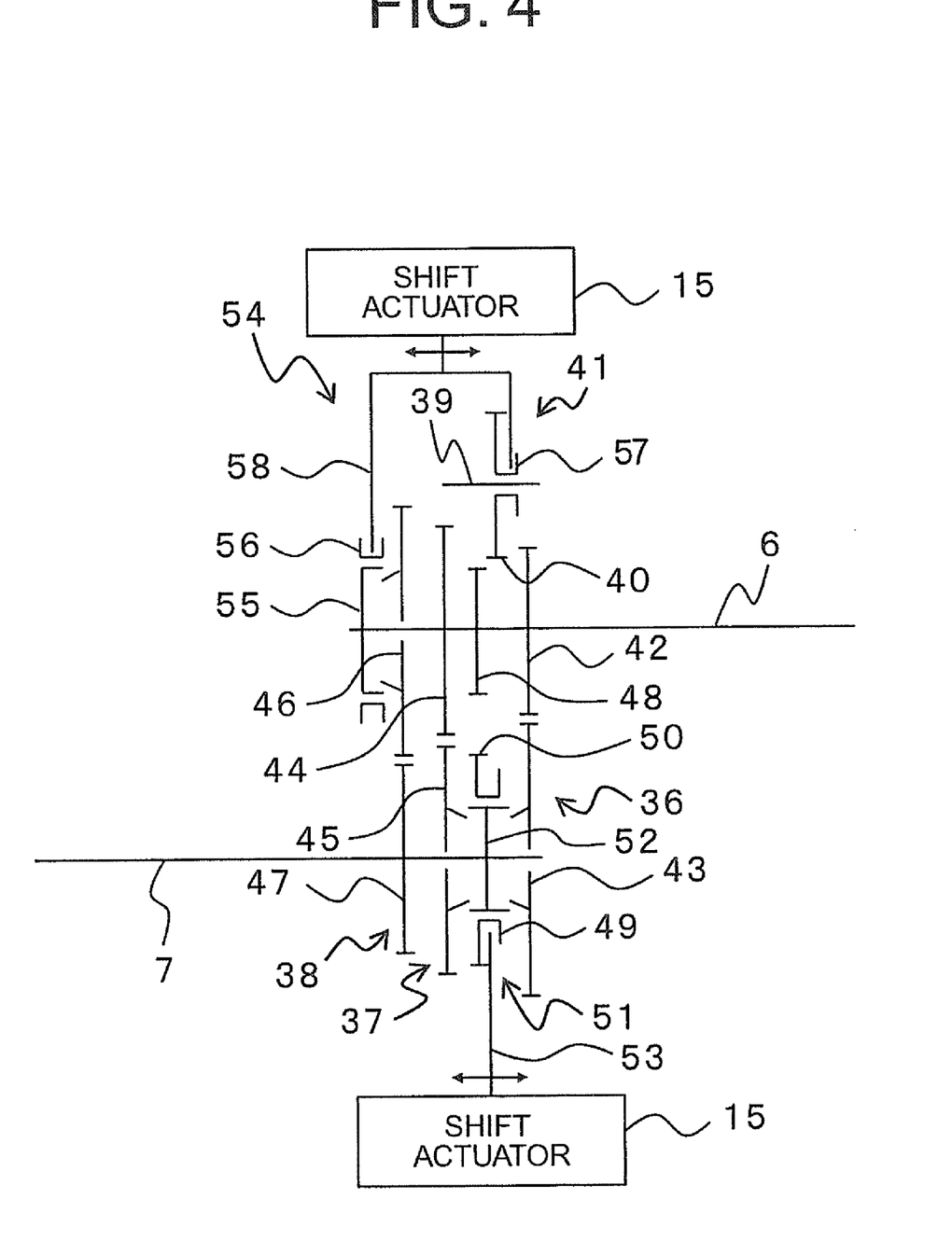
FIG. 4 is a construction view showing the details of a selection type gear train unit according to the first embodiment of the present invention.

FIG. 4 is a construction view that shows the details of the selection type gear train unit 9 according to the first embodiment of the present invention.

In FIG. 4, the selection type gear train unit 9 is arranged between the second input shaft 6 and the output shaft 7 for transmitting the rotation of the second input shaft 6 to the output shaft 7. The selection type gear train unit 9 includes a plurality of gear trains having a nonsynchronized gear train that does not use any synchronization mechanism.

The selection type gear train unit 9 includes a third-speed gear train 36 in the form of a low-speed side gear train corresponding to all the gear shift stages of the planetary gear mechanism 8, a fourth-speed gear train 37 and a fifth-speed gear train 38 in the form of a high-speed side gear trains corresponding to only the top speed stage of the planetary gear mechanism 8, and a driving reverse gear train 41 that corresponds only to the second speed stage of the planetary gear mechanism 8 and transmits rotation from the second input shaft 6 to the output shaft 7 through an idler reverse gear 40 (to be described later) that is rotatably supported on a reverse idler shaft 39.

Here, note that the driving reverse gear train 41 is a nonsynchronized gear train that does not use any synchronization mechanism.

The third-speed gear train 36 has a second input shaft side third-speed gear 42 fixedly mounted on the second input shaft 6, and an output shaft side third-speed gear 43 that is rotatably supported on the output shaft 7 and is in meshing engagement with the second input shaft side third-speed gear 42.

The fourth-speed gear train 37 has a second input shaft side fourth-speed gear 44 fixedly mounted on the second input shaft 6, and an output shaft side fourth-speed gear 45 that is rotatably supported on the output shaft 7 and is in meshing engagement with the second input shaft side fourth-speed gear 44.

The fifth-speed gear train 38 has a second input shaft side fifth-speed gear 46 rotatably supported on the second input shaft 6, and an output shaft side fifth-speed gear 47 that is fixedly mounted on the output shaft 7 and is in meshing engagement with the second input shaft side fifth-speed gear 46.

The driving reverse gear train 41 includes a second input shaft side driving reverse gear 48 fixedly mounted on the second input shaft 6, an output shaft side driving reverse gear 50 formed integrally with a first shift sleeve 49 (to be described later), and the idler reverse gear 40 that is rotatably supported on the reverse idler shaft 39 so as to be movable in an axial direction thereof in such a manner that it can be placed into meshing engagement with and disengagement from the second input shaft side driving reverse gear 48 and the output shaft side driving reverse gear 50.

In addition, a first gear shifter 51 for placing the output shaft 7 into selective engagement with the output shaft side third-speed gear 43 or the output shaft side fourth-speed gear 45 is mounted on the output shaft 7 at a location between the output shaft side third-speed gear 43 and the output shaft side fourth-speed gear 45.

The first gear shifter 51 includes a first shift hub 52 fixedly mounted on the output shaft 7, a first shift sleeve 49 that is supported on the first shift hub 52 so as to be movable in an axial direction thereof but not rotatable thereon in such a manner that it can be selectively engaged with and disengaged from the output shaft side third-speed gear 43 or the output shaft side fourth-speed gear 45, and a first shift fork 53 that has one end thereof engaged with the first shift sleeve 49 and the other end thereof connected with the shift actuator 15 that serves to shift the gear trains.

The shift actuator 15 acts to shift the gear trains by moving the first shift fork 53 in the axial direction thereby to selectively engage or disengage the first shift sleeve 49 with or from the output shaft side third-speed gear 43 and the output shaft side fourth-speed gear 45.

In addition, on the second input shaft 6 which are arranged at a side opposite to the first clutch 4 of the second input shaft side fifth-speed gear 46 and the reverse idler shaft 39, there is mounted a second gear shifter 54 that serves to place the second input shaft 6 and the second input shaft side fifth-speed gear 46 into engagement with each other and the idler reverse gear 40 and the second input shaft side driving reverse gear 48 into engagement with each other.

The second gear shifter 54 includes a second shift hub 55 fixedly mounted on the second input shaft 6, a second shift sleeve 56 that is supported on the second shift hub 55 so as to be movable in an axial direction thereof but not rotatable thereon in such a manner that it can be engaged with and disengaged from the second input shaft side fifth-speed gear 46, a reverse shift sleeve 57 formed integrally with the idler reverse gear 40, and a second shift fork 58 that has one end thereof branched so as to be engaged with the second shift sleeve 56 and the reverse shift sleeve 57, respectively, and the other end thereof connected with the shift actuator 15 that serves to shift the gear trains.

The shift actuator 15 acts to shift the gear trains by moving the second shift fork 58 in the axial direction thereby to selectively engage or disengage the second shift sleeve 56 and the reverse shift sleeve 57 with or from the second input shaft side fifth-speed gear 46 and the second input shaft side reverse gear 48, respectively.

Here, note that when the reverse shift sleeve 57 is engaged with the second input shaft side driving reverse gear 48, the idler reverse gear 40 also comes in meshing engagement with the output shaft side driving reverse gear 50.

In this manner, the automatic transmission 17 is provided with the planetary gear mechanism 8 arranged between the first input shaft 5 and the second input shaft 6 for transmitting the rotation of the first input shaft 5 to the second input shaft 6, and the selection type gear train unit 9 arranged between the second input shaft 6 and the output shaft 7 for transmitting the rotation of the second input shaft 6 to the output shaft 7, and thus forms five-speed or stage change gear ratios by combining the change-over of the change gear ratios according to the planetary gear mechanism 8 with the change-over of the change gear ratios according to the selection type gear train unit 9.

Here, in case of first gear, the gear shift control part 16 releases both of the band brake 32 and the direct clutch 35, whereby the first shift sleeve 49 is placed into engagement with the output shaft side third-speed gear 43.

Also, in case of second gear, the gear shift control part 16 tightens the band brake 32 and at the same time releases the direct clutch 35, whereby the first shift sleeve 49 is placed into engagement with the output shaft side third-speed gear 43, as in the case of first gear.

In addition, in case of third gear, the gear shift control part 16 releases the band brake 32 and connects the direct clutch 35, whereby the first shift sleeve 49 is placed into engagement with the output shaft side third-speed gear 43, as in the case of first gear.

Further, in case of fourth gear, the gear shift control part 16 releases the band brake 32 and connects the direct clutch 35 thereby to place the planetary gear mechanism 8 into third gear state, so that the first shift sleeve 49 is driven into engagement with the output shaft side fourth-speed gear 45.

Furthermore, in case of fifth gear, the gear shift control part 16 releases the band brake 32 and connects the direct clutch 35 thereby to place the planetary gear mechanism 8 into third gear state, so that the second shift sleeve 56 is driven into engagement with the second input shaft side fifth-speed gear 46.

In addition, in case of the reverse gear or drive, the gear shift control part 16 tightens the band brake 32 and releases the direct clutch 35 thereby to place the planetary gear mechanism 8 into second gear state, so that the reverse shift sleeve 57 is driven into engagement with the second input shaft reverse gear 48.

Figure 5:
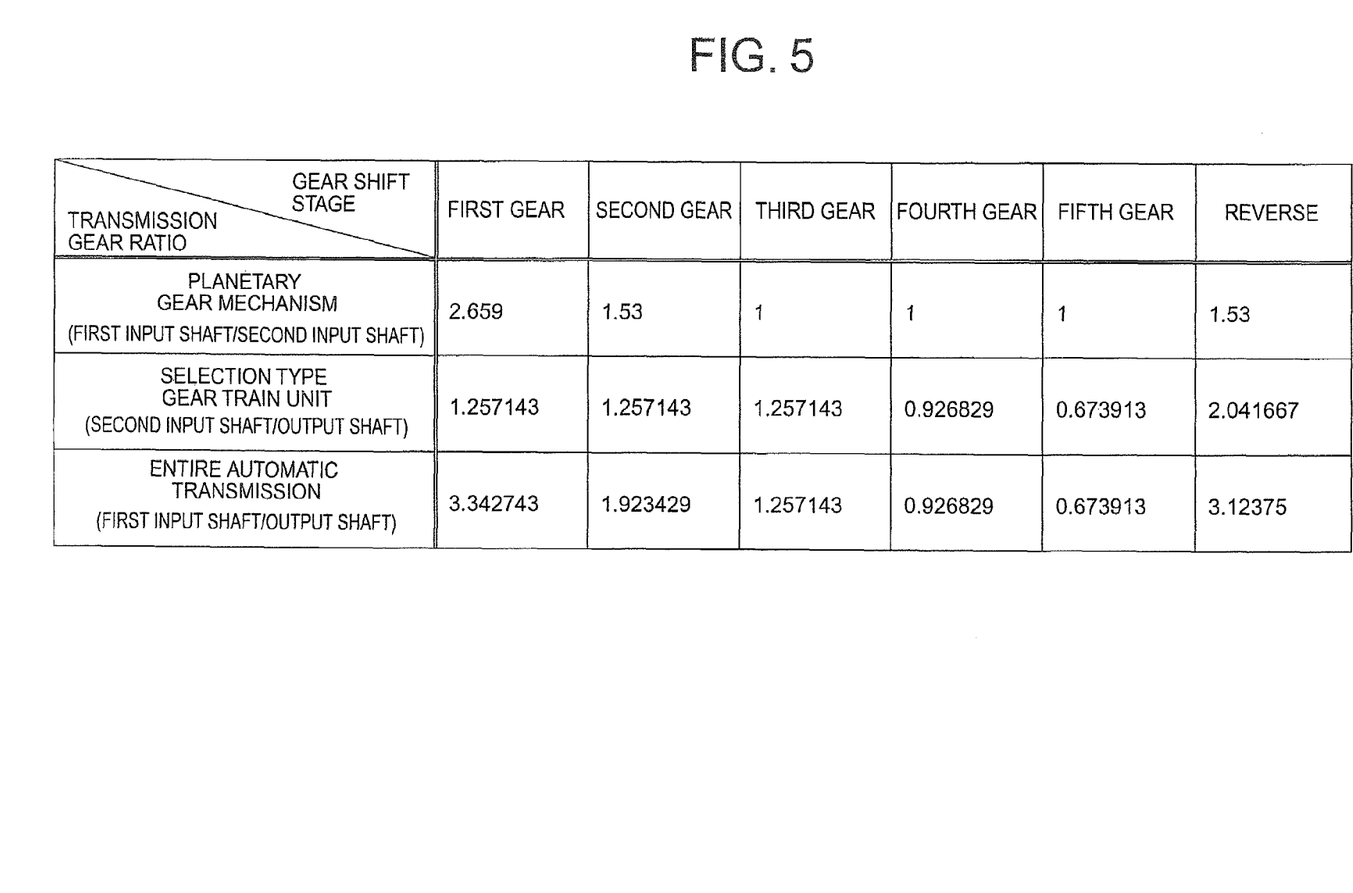
FIG. 5 is an explanatory view showing change or transmission gear ratios in the case of five-speed or stage change gear ratios that are formed by combining the change-over of the change gear ratios according to the planetary gear mechanism with the change-over of the change gear ratios according to the selection type gear train unit of the first embodiment of the present invention.

FIG. 5 is an explanatory view that shows change or transmission gear ratios in the case of five-speed or stage change gear ratios that are formed by combining the change-over of the change gear ratios according to the planetary gear mechanism 8 with the change-over of the change gear ratios according to the selection type gear train unit 9 of the first embodiment of the present invention.

In FIG. 5, in cases where the transmission gear is changed from first gear to second gear, from second gear to third gear, from third gear to second gear, and second gear to first gear, respectively, only the transmission gear ratio of the planetary gear mechanism 8 is changed with the transmission gear ratio of the selection type gear train unit 9 being kept fixed to third gear (1.257413), whereby the overall transmission gear ratio (=the rotation speed of the first input shaft 5/the rotation speed of the output shaft 7) of the automatic transmission 17 as a whole is changed over.

In addition, when the transmission gear is changed from third gear to fourth gear, from fourth gear to fifth gear, from fifth gear to fourth gear, and from fourth gear to third gear, respectively, only the transmission gear ratio of the selection type gear train unit 9 is changed while the transmission gear ratio of the planetary gear mechanism 8 is kept fixed to third gear (1), the overall transmission gear ratio of the automatic transmission 17 (=the rotation speed of the first input shaft 5/the rotation speed of the output shaft 7) is changed over.

Also, when the transmission gear is changed to the driving reverse gear train 41, the transmission gear ratio of the selection type gear train unit 9 is changed to the transmission gear ratio of the driving reverse gear train 41 with the transmission gear ratio of the planetary gear mechanism 8 remaining fixed to second gear (1.53), so the overall transmission gear ratio of the automatic transmission 17 (=the rotation speed of the first input shaft 5/the rotation speed of the output shaft 7) is changed to the ratio of the driving reverse gear (3.12375).

Hereinafter, reference will be made to the operation of the gear shift control part 16 according to the first embodiment of the present invention while referring to a flow chart in FIG. 6 together with FIGS. 1 through 5.

Here, note that in this embodiment, a shift operation to the driving reverse gear train 41, which is a nonsynchronized gear train, will be described as an example.

First of all, when a request for shift to the driving reverse gear train 41 is generated, the first clutch 4 is released (step S61). Though it is desired that a shift be made to the driving reverse gear train 41 soon after the release of the first clutch 4, the rotation speed of the second input shaft 6 immediately after the release of the first clutch 4 becomes the rotation speed of the engine (in general, the idle rotation speed) immediately before the release of the first clutch 4 due to the inertia of the planetary gear mechanism 8.

Subsequently, the band brake 32 is applied or tightened (step S62), and at the same time, the direct clutch 35 is connected (step S63), whereby the rotation speed of the second input shaft 6 is reduced.

Here, the reverse shift sleeve 57 is made to move toward the second input shaft side driving reverse gear 48 (step S64), and to wait just in front of the location the idler reverse gear 40 comes in meshing engagement with the second input shaft side driving reverse gear 48.

Then, it is determined whether the second rotation speed is less than or equal to a predetermined rotation speed (e.g., 300 rpm) which is set beforehand (step S65).

When it is determined in step S65 that the second rotation speed is larger than the predetermined rotation speed (that is, No), the control flow shifts to step S62, whereas when it is determined in step S65 that the second rotation speed is less than or equal to the predetermined rotation speed (that is, Yes), the reverse shift sleeve 57 is made to move so that the idler reverse gear 40 is placed into meshing engagement with the second input shaft side driving reverse gear 48 (step S66).

Subsequently, the direct clutch 35 is released (step S67), whereby the transmission gear ratio of the planetary gear mechanism 8 is changed to second gear, and it is determined whether the ratio between the rotation speeds of the first input shaft 5 and the second input shaft 6 is equal to the transmission gear ratio of second gear (step S68).

Figure 6:
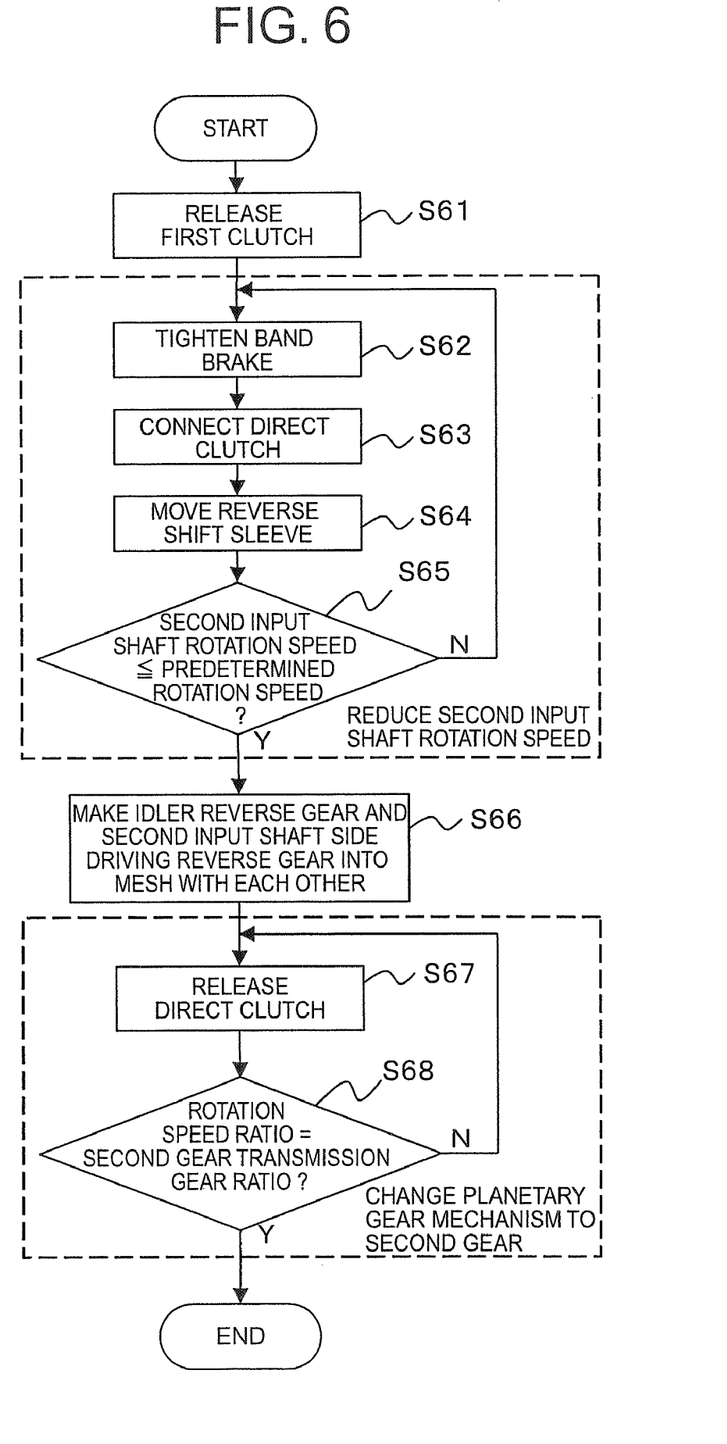
FIG. 6 is a flow chart illustrating the operation of the transmission apparatus according to the first embodiment of the present invention.

When it is determined in step S68 that the above-mentioned rotation speed ratio is equal to the transmission gear ratio of second gear (that is, Yes), the processing of FIG. 6 is terminated, whereas when it is determined in step S68 that the rotation speed ratio is not equal to the transmission gear ratio of second gear (that is, No), the control flow shifts to step S67.

Figure 7:
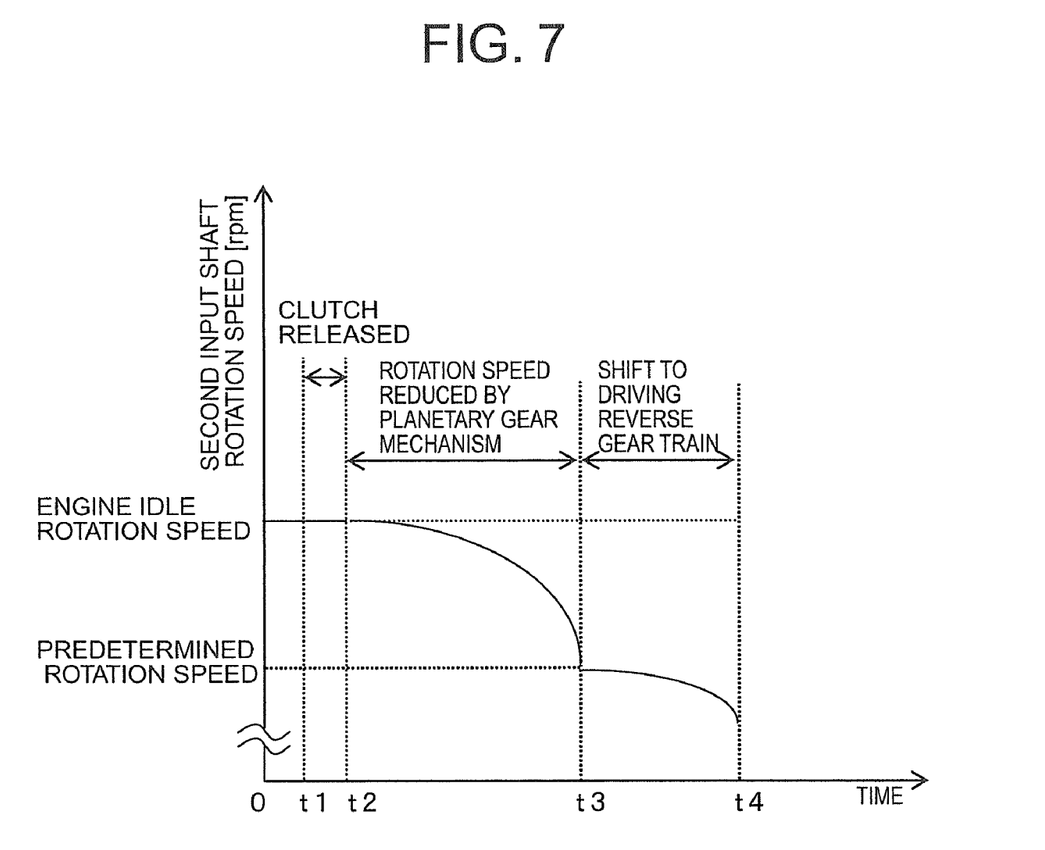
FIG. 7 is a timing chart supplementally explaining the operation of the transmission apparatus illustrated in the flow chart of FIG. 6.

FIG. 7 is a timing chart that supplementally explains the operation of the transmission apparatus 1 illustrated in the flow chart of FIG. 6.

In FIG. 7, first of all, when a request for shift to the driving reverse gear train 41 is generated, the first clutch 4 is released at time t1.

Subsequently, at time t2, the band brake 32 is applied or tightened and the direct clutch 35 is connected, so that the rotation speed of the second input shaft 6 is decreased gradually.

Then, at time t3 at which the second rotation speed is decreased to the predetermined rotation speed, the reverse shift sleeve 57 is moved to place the idler reverse gear 40 and the second input shaft side driving reverse gear 48 into meshing engagement with each other.

Subsequently, the direct clutch 35 is released to change the transmission gear ratio of the planetary gear mechanism 8 to second gear, and the shift operation to the driving reverse gear train 41 is completed at time t4 at which the ratio between the rotation speeds of the first input shaft 5 and the second input shaft 6 becomes equal to the transmission gear ratio of second gear.

According to the transmission apparatus 1 of the first embodiment of the present invention, when a request for shift to the driving reverse gear train 41 that does not use any synchronization mechanism is generated, the gear shift control part 16 releases the first clutch 4, tightens the band brake 32, and connects the direct clutch 35, whereby the rotation speed of the second input shaft 6 is reduced, and when the second rotation speed becomes equal to or less than the predetermined rotation speed, the transmission gear is changed to the driving reverse gear train 41. As a result, the shift operation can be completed in a quick manner without generating tooth contact and gear noise.

In addition, the rotation speed of the second input shaft 6 is reduced by tightening the band brake 32 and connecting the direct clutch 35, so there is no need to add any new component element, and hence an increase in cost can be avoided.

Embodiment 2

In the above-mentioned first embodiment, upon generation of a shift request, the gear shift control part 16 releases the first clutch 4, tightens the band brake 32, and connects the direct clutch 35 thereby to reduce the rotation speed of the second input shaft 6, but the present invention is not limited to this.

Thus, the gear shift control part 16 may reduce the rotation speed of the second input shaft 6 by changing the transmission gear ratio of the planetary gear mechanism 8 with the clutch being connected.

Hereinbelow, reference will be made to the processing of reducing the rotation speed of the second input shaft 6 by switching or changing the transmission gear ratio of the planetary gear mechanism 8.

The configuration or construction of a transmission apparatus according to a second embodiment of the present invention is the same as that of the above-mentioned first embodiment, and hence a detailed explanation thereof is omitted.

Here, note that when a request for shift to the nonsynchronized gear train is generated, the gear shift control part 16 releases the band brake 32 and the direct clutch 35 to switch or change the transmission gear ratio of the planetary gear mechanism 8 to first gear (2.659), so that the rotation speed ratio of the first input shaft 5 and the second input shaft 6 is controlled so as to become the transmission gear ratio (predetermined ratio) of first gear, and when the rotation speed ratio becomes the transmission gear ratio of first gear, the first clutch 4 is released to shift the transmission gear to a nonsynchronized gear train.

Hereinafter, reference will be made to the operation of the gear shift control part 16 according to the second embodiment of the present invention while referring to a flow chart in FIG. 8 together with FIGS. 1 through 4.

Here, note that in this second embodiment, a shift operation to the driving reverse gear train 41, which is a nonsynchronized gear train, will be described as an example.

First of all, when a request for shift to the driving reverse gear train 41 is generated, the band brake 32 is released (step S71), and at the same time, the direct clutch 35 is released (step S72) and the transmission gear ratio of the planetary gear mechanism 8 is switched or changed to first gear.

Here, note that the first input shaft 5 is at an idle rotation speed (about 800 rpm), and hence the rotation speed of the second input shaft 6 is decreased by the transmission gear ratio of the planetary gear mechanism 8 to become about 300 (=800/2.659) rpm.

At this time, the reverse shift sleeve 57 is made to move toward the second input shaft side driving reverse gear 48

(step S73), and to stand by just in front of the location the idler reverse gear 40 is placed into meshing engagement with the second input shaft side driving reverse gear 48.

Subsequently, it is determined whether the rotation speed ratio between the first input shaft 5 and the second input shaft 6 is equal to the transmission gear ratio of first gear (step S74), and when it is determined in step S74 that the above-mentioned rotation speed ratio is not equal to the transmission gear ratio of first gear (that is, No), the control flow shifts to step S71, whereas when it is determined in step S74 that the rotation speed ratio is equal to the transmission gear ratio of first gear (that is, Yes), the first clutch 4 is released (step S75) to move the reverse shift sleeve 57 so that the idler reverse gear 40 is placed into meshing engagement with the second input shaft side driving reverse gear 48 (step S76).

Then, the band brake 32 is tightened (step S77) to change the transmission gear ratio of the planetary gear mechanism 8 to second gear, and it is determined whether the rotation speed ratio between the first input shaft 5 and the second input shaft 6 is equal to the transmission gear ratio of second gear (step S78).

Figure 8:
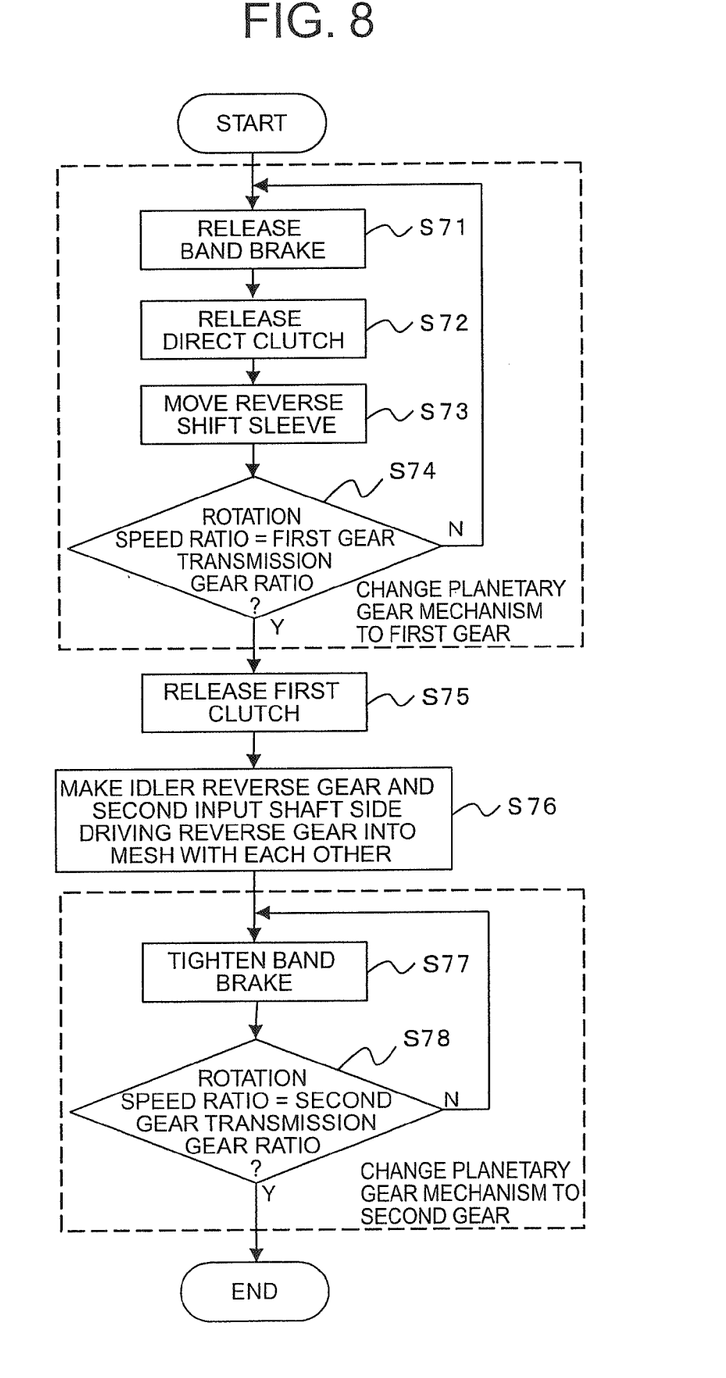
FIG. 8 is a flow chart illustrating the operation of a transmission apparatus according to a second embodiment of the present invention.

When it is determined in step S78 that the above-mentioned rotation speed ratio is equal to the transmission gear ratio of second gear (that is, Yes), the processing of FIG. 8 is terminated, whereas when it is determined in step S78 that the rotation speed ratio is not equal to the transmission gear ratio of second gear (that is, No), the control flow shifts to step S77.

Figure 9:
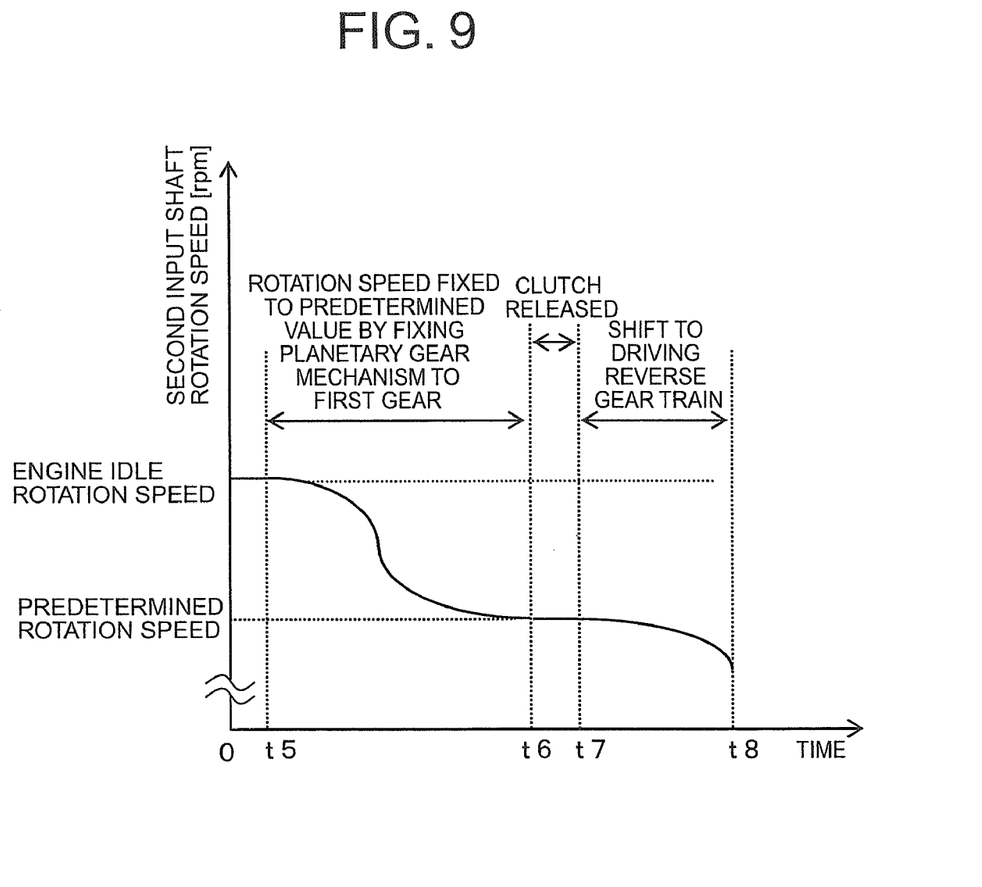
FIG. 9 is a timing chart supplementally explaining the operation of the transmission apparatus illustrated in the flow chart of FIG. 8.

FIG. 9 is a timing chart that supplementally explains the operation of the transmission apparatus 1 illustrated in the flow chart of FIG. 8.

In FIG. 9, first of all, when a shift request to the driving reverse gear train 41 is generated, the band brake 32 and the direct clutch 35 are released at time t5, whereby the rotation speed of the second input shaft 6 is decreased by the transmission gear ratio of the planetary gear mechanism 8.

Then, at time t6 at which the rotation speed ratio between the first input shaft 5 and the second input shaft 6 is reduced to the transmission gear ratio of first gear (2.659), the first clutch 4 is released, and at time t7, the reverse shift sleeve 57 is moved to place the idler reverse gear 40 and the second input shaft side driving reverse gear 48 into meshing engagement with each other.

Subsequently, the band brake 32 is tightened to change the transmission gear ratio of the planetary gear mechanism 8 to second gear, and the shift operation to the driving reverse gear train 41 is completed at time t8 at which the ratio between the rotation speeds of the first input shaft 5 and the second input shaft 6 becomes equal to the transmission gear ratio of second gear.

According to the transmission apparatus 1 of the second embodiment of the present invention, upon generation of a shift request to the driving reverse gear train 41, which does not use any synchronization mechanism, the gear shift control part 16 releases the band brake 32 and the direct clutch 35 thereby to change the transmission gear ratio of the planetary gear mechanism 8 to first gear, so that the rotation speed ratio between the first input shaft 5 and the second input shaft 6 is controlled so as to become equal to the transmission gear ratio of first gear, and when the rotation speed ratio becomes equal to the transmission gear ratio of first gear, the first clutch 4 is released to shift the transmission gear to the nonsynchronized gear train. As a result, the shift operation can be completed in a quick manner without generating tooth contact and gear noise.

While the invention has been described in terms of preferred embodiments, those skilled in the art will recognize that the invention can be practiced with modifications within the spirit and scope of the appended claims.

What is claimed is:

1. A transmission apparatus comprising:
a crankshaft that takes out the power of an engine as a rotational force;
a first clutch that is connected with the crankshaft for transmitting and interrupting the rotation of the engine;
a first input shaft that is connected with the first clutch at a side opposite to the crankshaft;
a second input shaft that is arranged on an extension of the first input shaft;
an output shaft that is arranged in parallel to the first input shaft and the second input shaft;
a planetary gear mechanism that includes a first planetary gear train, a second planetary gear train, a sun gear being common for the first and second planetary gear trains, a band brake for fixing the sun gear, and a second clutch that connects the sun gear with a first ring gear of the first planetary gear train, the planetary gear mechanism being operable to transmit the rotation of the first input shaft to the second input shaft;
a selection type gear train unit that includes a plurality of gear trains having a nonsynchronized gear train that does not use any synchronization mechanism, the selection type gear train unit being operable to transmit the rotation of the second input shaft to the output shaft;
a second rotation speed detection part that detects the rotation speed of the second input shaft as a second rotation speed;
a first clutch actuator that drives the first clutch;
a band brake actuator that drives the band brake;
a second clutch actuator that drives the second clutch;
a shift actuator that shifts the gear trains of the selection type gear train unit; and
a gear shift control part to which the second rotation speed is input, and which controls the operations of the first clutch actuator, the band brake actuator, the second clutch actuator and the shift actuator;
wherein when a request for shift to the nonsynchronized gear train is generated, the gear shift control part releases the first clutch, tightens the band brake, and at the same time connects the second clutch thereby to decrease the second rotation speed, and when the second rotation speed becomes equal to or less than a predetermined rotation speed, the gear shift control part shifts the gear trains of the selection type gear train unit to the nonsynchronized gear train.

2. A transmission apparatus comprising:
a crankshaft that takes out the power of an engine as a rotational force;
a first clutch that is connected with the crankshaft for transmitting and interrupting the rotation of the engine;
a first input shaft that is connected with the first clutch at a side opposite to the crankshaft;
a second input shaft that is arranged on an extension of the first input shaft;
an output shaft that is arranged in parallel to the first input shaft and the second input shaft;
a planetary gear mechanism that includes a first planetary gear train, a second planetary gear train, a sun gear being common for the first and second planetary gear trains, a band brake for fixing the sun gear, and a second clutch that connects the sun gear with a first ring gear of the first planetary gear train, the planetary gear mechanism being operable to transmit the rotation of the first input shaft to the second input shaft;

a selection type gear train unit that includes a plurality of gear trains having a nonsynchronized gear train that does not use any synchronization mechanism, the selection type gear train unit being operable to transmit the rotation of the second input shaft to the output shaft;

a first rotation speed detection part that detects the rotation speed of the first input shaft as a first rotation speed;

a second rotation speed detection part that detects the rotation speed of the second input shaft as a second rotation speed;

a first clutch actuator that drives the first clutch;

a band brake actuator that drives the band brake;

a second clutch actuator that drives the second clutch;

a shift actuator that shifts the gear trains of the selection type gear train unit; and a gear shift control part to which the second rotation speed is input, and which controls the operations of the first clutch actuator, the band brake actuator, the second clutch actuator and the shift actuator;

wherein when a request for shift to the nonsynchronized gear train is generated, the gear shift control part controls the operations of the band brake actuator and the second clutch actuator in such a manner that a ratio between the rotation speeds of the first input shaft and the second input shaft becomes a predetermined ratio, and when the ratio between the rotation speeds of the first input shaft and the second input shaft becomes the predetermined ratio, the gear shift control part releases the first clutch thereby to shift the gear trains of the selection type gear train unit to the nonsynchronized gear train.

* * * * *